Aug. 16, 1927.
A. J. CORMIER
1,639,369
SHOCK ABSORBING MEANS FOR VEHICLES
Filed Jan. 4, 1926
2 Sheets-Sheet 1
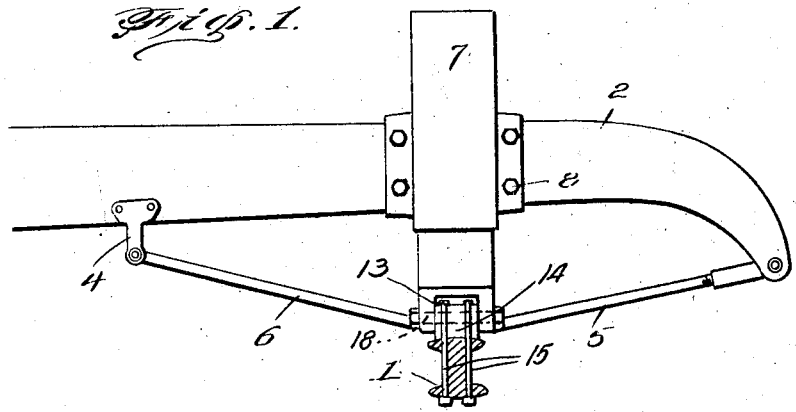
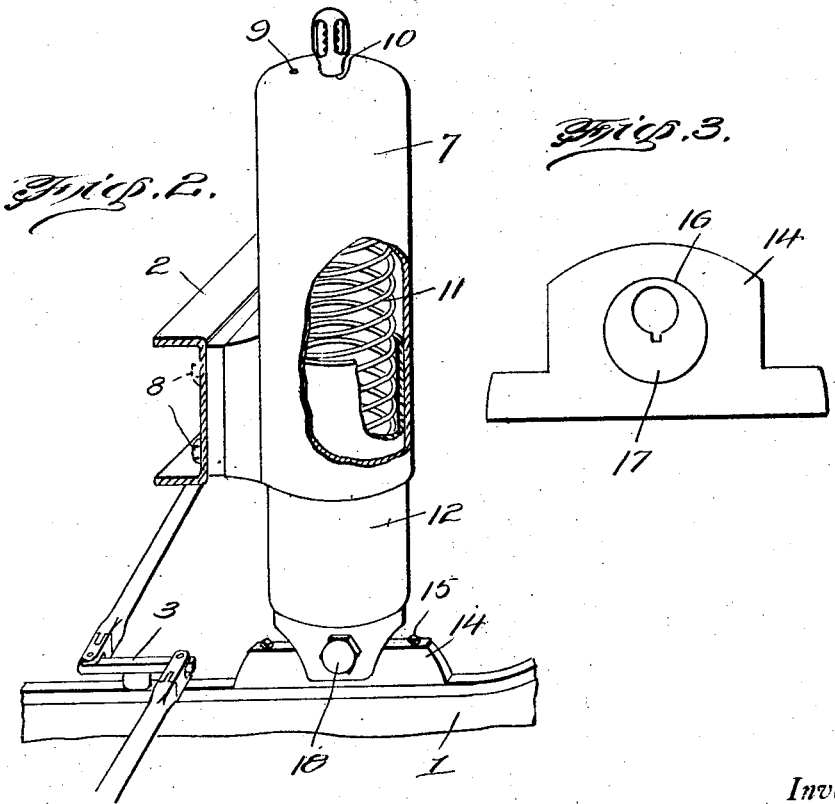
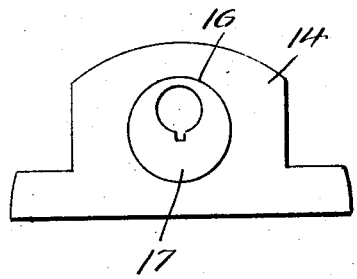
Inventor
A. J. Cormier
By Clarence A. O'Brien
Attorney

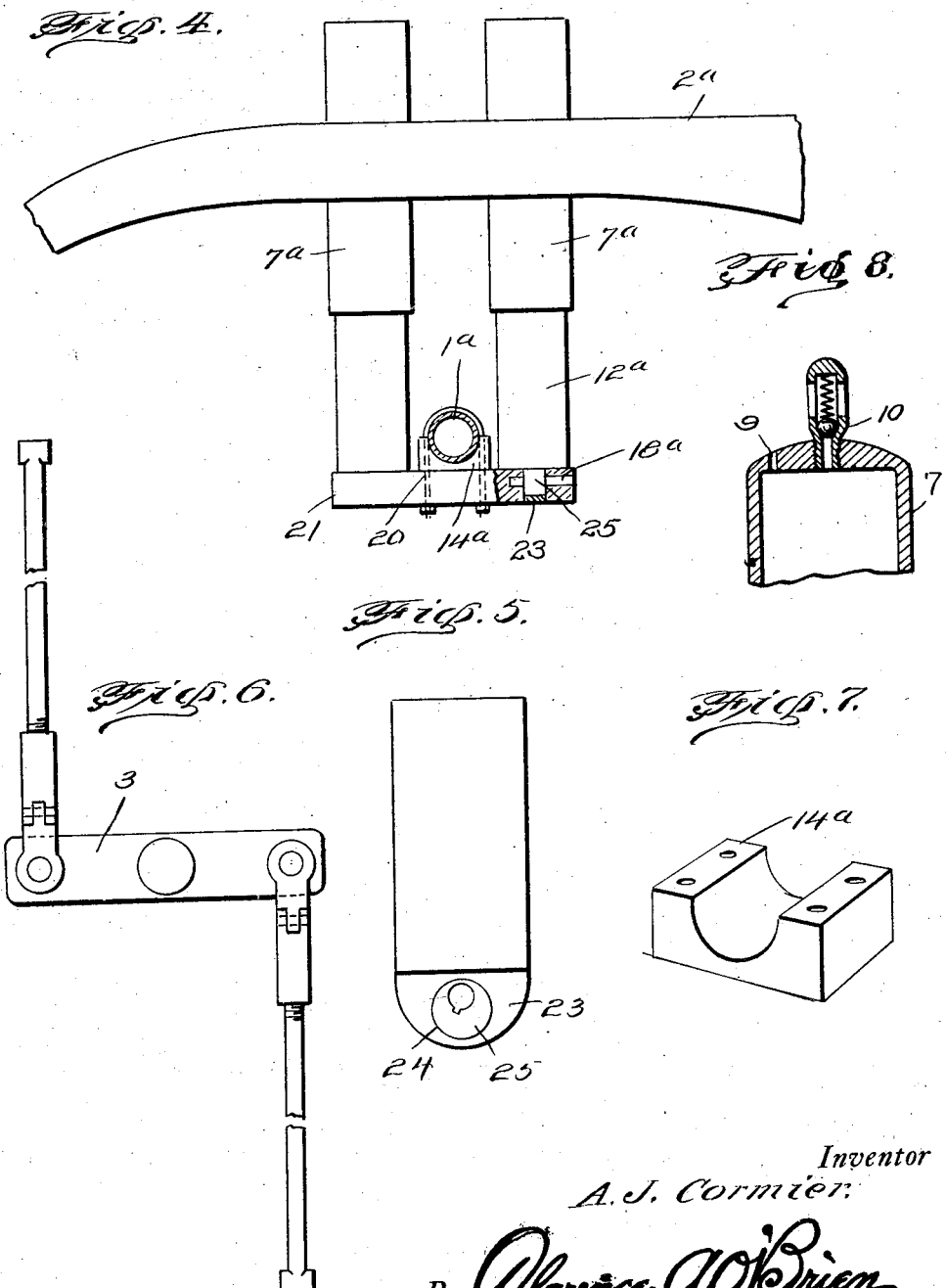

Patented Aug. 16, 1927.

1,639,369

UNITED STATES PATENT OFFICE.

ALFRED J. CORMIER, OF LONG BEACH, CALIFORNIA.

SHOCK-ABSORBING MEANS FOR VEHICLES.

Application filed January 4, 1926. Serial No. 79,161.

My present invention pertains to means for absorbing shocks and jars in vehicles, more especially motor vehicles, and it seeks to provide a shock absorbing equipment that is simple and compact in construction, and susceptible of ready installation in motor vehicles, and possessed of high efficiency in preventing the transmission of shocks and jars and in precluding undue rebound of a motor vehicle body.

Other objects and practical advantages of the invention will be fully understood from the following description and claims when the same are read in connection with the drawings, accompanying and forming part of this specification, in which:—

Figure 1 is a fragmentary side elevation illustrative of the preferred embodiment of my invention as applied to the front axle of a motor vehicle.

Figure 2 is an enlarged perspective, partly broken away, and showing the equipment in detail.

Figure 3 is an enlarged detail side elevation illustrative of the manner in which the block on the front axle carries the swingable bushing comprised in my improvement.

Figure 4 is a detail view illustrating the duplex embodiment of my invention as associated with the rear axle housing of a motor vehicle.

Figure 5 is a detail view showing the relative arrangement of one of the pistons and its swingable bushing.

Figure 6 is a broken detail plan view of the equalizing brace mechanism comprised in my improvement.

Figure 7 is a detail perspective of the cradle block for the axle housing.

Figure 8 is a detail section illustrating the upper portion of the cylinder 7 and the appurtenances thereof.

Similar numerals of reference designate corresponding parts in Figures 1, 2, 3 and 6 and 8, to which reference will first be made.

I show in Figures 1 and 2, a portion of the front axle of an automobile, the said axle being numbered 1, and I also show at 2 a chassis portion. For the purpose of permitting free up and down movement of the axle 1, while preventing forward and backward movement of the axle so as to relieve the spring of undue strains and stresses I prefer to employ the bracing means shown in Figures 1, 2 and 6, the said means comprising a rockable member 3 carried by and mounted on the axle 1, a hanger 4 stationary on the chassis portion 2, a rod 5 interposed between and connected to the chassis portion 2 and one arm of the member 3, and a rod 6 interposed between and connected to the other arm of the member 3 and the stationary hanger 4. Manifestly the elements arranged as described may be depended upon to prevent backward or forward movement of the axle for the purpose indicated, and this while permitting free up and down movement of the axle.

In accordance with my invention, a cylinder 7 is fixedly connected in appropriate manner at one side of the chassis portion 2, the connection being preferably effected through the medium of bolts 8, and the cylinder being preferably spaced from the side of the chassis portion 2 as appears in Figure 2. Said cylinder 7 is open at its lower end and closed at its upper end, and is provided in its said upper end with a vent aperture 9 and a check valve 10, the said check valve 10 being arranged to permit the escape of air when the spring 11 is compressed, and to check the escape of air incident to expansion of the said spring. In other words the said check valve 10 is a non-return valve arranged to close inwardly or downwardly.

The spring 11 is received in a piston 12 which is of hollow type, and is adapted to move freely in the cylinder 7 so that the spring 11 is interposed between the upper end of the cylinder 7 and the bottom or lower end of the piston 12. At its lower end the piston 12 is bifurcated as designated by 13 in Figure 1, and in the said bifurcation is arranged a block 14 that is superposed upon and connected by bolts 15 or other means to the axle 1. The said block 14 is provided at 16 with a circular bearing opening, and in the said opening is disposed the swingable bushing 17 of my improvement. The said bushing 17 is keyed or otherwise fixed to a bolt 18 which extends diametrically through the lower end of the piston 12 as best shown in Figure 1. By virtue of the employment of bushing 17 in the connection of the piston 12 to the axle 1, movement of the axle relative to the piston 12 is permitted, and the play of the axle is compensated for when the spring and the shock absorbing means as a whole are in operation.

The function of the vent aperture 9 is to permit air to enter the cylinder 7 slowly so that the air will constitute a cushion in the upper portion of the cylinder 7 which cushion will effectively prevent undue rebound incident to the expansion of the spring 11.

From the foregoing it will be apreciated that my improvement as described is adapted to serve snubbing purposes and in that way contribute materialy to the comfort of the occupant of the motor vehicle body.

In the duplex embodiment shown in Figure 4, the chassis portion is designated by $2^a$, and the rear axle housing by $1^a$. A cradle block $14^a$ receives the housing $1^a$, and is appropriately connected at 20 to a head 21 upon which it is superposed. It will also be noticed that a common connection is employed to join the block $14^a$ and the head 21, and to straddle the axle housing $1^a$ and hold the block $14^a$ thereto. The cylinders $7^a$ of the duplex embodiment are similar in construction to the cylinder 7 of Figure 2, and are appropriately connected to the chassis portion $2^a$. The pistons $12^a$ of the said duplex embodiment are connected with the head 21, at opposite sides of the axle housing $1^a$, and are movable in the cylinders $7^a$ and against the action of springs 11 similar in construction and in relative arrangement to the spring 11 shown in Figure 2, it being understood in this connection that the pistons $12^a$ are also similar to the piston 12 in the respect that they are hollow and open at their upper ends and are adapted to receive springs similar to the springs 11 so that the said springs will be interposed between and will abut against the upper ends of the cylinders $7^a$ and the lower ends or bottoms of the pistons $12^a$. Being of duplex type the cushioning means shown in Figure 4 will manifestly afford adequate shock absorbing equipment for the rear portion of a motor vehicle or other vehicle in which it is desired to embody my improvement.

The head 21 is provided with openings 22 to receive the reduced lower end portions 23 of the pistons $12^a$, and it will be observed that the said piston portions 23 are provided with circular openings 24 in which are disposed bushings 25 similar to the bushing 17 before described. Bolts $18^a$ are carried by the head 21 and are extended through and keyed to or otherwise fixedly attached to the bushings 25. It will be noticed here that the bolts $18^a$ and the bolt 18 of Figures 1 and 2, are each arranged off the center of its respective bushing, this in order to enable the said bushings to better perform the function ascribed to them.

In addition to the practical advantages hereinbefore ascribed to my improvement, it will be readily appreciated that the improvement is simple and compact and is, therefore, not liable to render an automobile cumbersome in appearance; and it will also be appreciated that the improvements are simple and inexpensive in construction, are susceptible of ready installation in motor vehicles at present in use, and are free of delicate parts such as are liable to get out of order after a short period of use.

I have entered into a detailed description of the construction and relative arrangement of the parts embraced in the present and preferred embodiments of my invention in order to impart a full, clear and exact understanding of the said embodiments. I do not desire, however, to be understood as confining myself to the specific construction and relative arrangement of parts as disclosed, my invention being defined by my appended claims within the scope of which changes in structure and arrangement may be made without departure from my invention.

Having described my invention, what I claim and desire to secure by Letters-Patent, is:—

1. In a shock absorber and in combination, a chassis portion, a member disposed below the chassis portion, a cylinder carried by the chassis portion, a piston movable in said cylinder, spring means interposed between the cylinder and the piston, and a connection between the piston and the said member below the chassis portion, said connection including a bearing connected with the said member, a bushing turnable in said bearing, and a pin keyed in the bearing off the center thereof and connecting the piston and bearing.

2. In a shock absorber and in combination, a chassis portion, a member disposed below and movable relative to the chassis portion, a cylinder connected with the chassis portion and open at its lower end and having a non-return valve in its upper end, a piston telescopically arranged and movable in the cylinder and open at its upper end and closed at its lower end and connected at its lower end with the said member below the chassis portion, and a spring disposed in the piston and extending above the piston and disposed partly in the cylinder and interposed between the upper end of the cylinder and the closed lower end of the piston.

In testimony whereof I affix my signature.

ALFRED J. CORMIER.